(No Model.)
J. W. BRIDGE.
PLOW ATTACHMENT.
No. 427,733. Patented May 13, 1890.
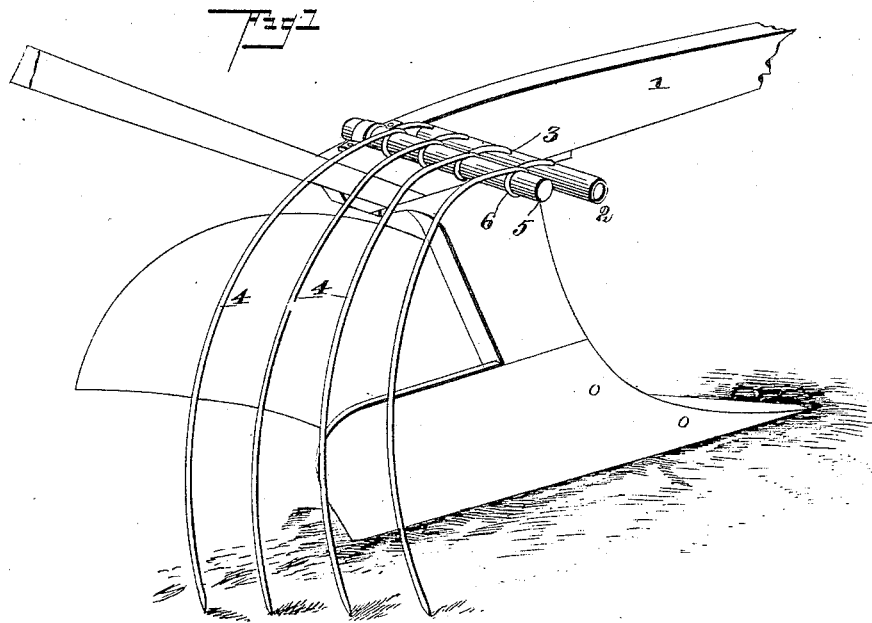
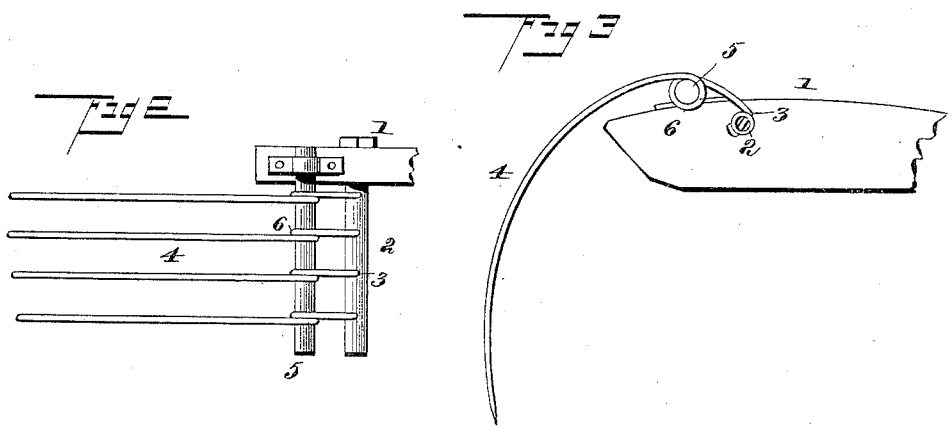
Witnesses
John Imure
H. F. Riley
Inventor
James W. Bridge
By his Attorneys
C. A. Snow & Co.

UNITED STATES PATENT OFFICE.

JAMES W. BRIDGE, OF YOUNG AMERICA, INDIANA.

PLOW ATTACHMENT.

SPECIFICATION forming part of Letters Patent No. 427,733, dated May 13, 1890.

Application filed February 14, 1890. Serial No. 340,420. (No model.)

*To all whom it may concern:*

Be it known that I, JAMES W. BRIDGE, a citizen of the United States, residing at Young America, in the county of Cass and State of Indiana, have invented a new and useful Plow Attachment, of which the following is a specification.

The invention relates to improvements in plow attachments.

The object of the present invention is to provide a plow with a rake arranged to carry the grass and stubble into the furrow and enable the grass and stubble to be entirely covered by the next furrow.

Furthermore, the object of the invention is to arrange the plow in close proximity to the operator and enable it to be readily cleaned should it get choked.

The invention consists in the construction and novel combination and arrangement of parts hereinafter fully described, illustrated in the accompanying drawings, and pointed out in the claims hereto appended.

In the drawings, Figure 1 is a perspective view of a plow provided with a rake constructed in accordance with this invention. Fig. 2 is a plan view. Fig. 3 is a side elevation.

Referring to the accompanying drawings, 1 designates the beam of a plow of the ordinary construction, which has projecting laterally from it, on the side having the landside, a pipe or tube 2, in which are secured the head ends 3 of a series of tines 4 of a rake. The rod or pipe 3 is arranged in an opening or recess that extends transversely through the plow-beam, and it is secured in said opening by any suitable means. The tines are inserted through the rod or pipe 3 and are secured thereto by bending the ends against the lower face thereof, and the said tines 4, after leaving the rod or pipe 3, are coiled around and supported and braced by a rod 5, curve rearwardly beyond the plow, and are adapted to rake the grass and stubble into the bottom of the furrow. The rod 5 is suitably secured to the top of the plow-beam, slightly in advance of the standard, and is passed through loops or coils 6 of the tines; and I desire it to be understood that I do not limit myself to the precise details of construction herein shown and described, as I may, without departing from the spirit of the invention, make minor changes therein—such as securing the rod 5 to the plow-beams in the rear of the standard.

From the foregoing description and the accompanying drawings the construction, operation, and advantages of the invention will readily be understood.

Having thus described my invention, I claim—

1. The combination, with a plow provided with a transverse opening, of the rod or pipe projecting laterally from the plow and secured in said transverse opening, the rake-tines secured to said rod or pipe and curving rearwardly beyond the plow and arranged to throw grass and stubble in the bottom of the furrow and provided with a series of loops or coils 6, and the rod suitably clamped to the plow-beam and extending out laterally therefrom and being arranged in said loops or coils and bracing and supporting the tines, substantially as described.

2. The combination, with the rod or pipe projecting laterally from the plow, of the rake-tines secured to said rod or pipe and curving rearwardly beyond the plow and arranged to throw grass and stubble in the bottom of the furrow and provided with a series of loops or coils 6, and the rod suitably clamped to the plow-beam and extending out laterally therefrom and being arranged in said loops or coils and bracing and supporting the tines, substantially as described.

In testimony that I claim the foregoing as my own I have hereto affixed my signature in presence of two witnesses.

JAMES W. BRIDGE.

Witnesses:
EZRA KAHL,
WILLIAM E. NOLAN.